(12) United States Patent
Fujimura et al.

(10) Patent No.: US 12,063,521 B2
(45) Date of Patent: Aug. 13, 2024

(54) TERMINAL COMMUNICATION METHOD AND SYSTEM FOR TCI STSTEM SWITCHING

(71) Applicant: NTT DOCOMO, INC., Tokyo (JP)

(72) Inventors: Naoki Fujimura, Tokyo (JP); Takuma Takada, Tokyo (JP); Yuichi Kakishima, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 331 days.

(21) Appl. No.: 17/439,260

(22) PCT Filed: Mar. 20, 2019

(86) PCT No.: PCT/JP2019/011926
§ 371 (c)(1),
(2) Date: Sep. 14, 2021

(87) PCT Pub. No.: WO2020/188829
PCT Pub. Date: Sep. 24, 2020

(65) Prior Publication Data
US 2022/0201504 A1 Jun. 23, 2022

(51) Int. Cl.
*H04W 16/28* (2009.01)
*H04W 24/10* (2009.01)
*H04W 76/20* (2018.01)

(52) U.S. Cl.
CPC ........... *H04W 16/28* (2013.01); *H04W 24/10* (2013.01); *H04W 76/20* (2018.02)

(58) Field of Classification Search
None
See application file for complete search history.

(56) References Cited

U.S. PATENT DOCUMENTS

| 2018/0227031 | A1 | 8/2018 | Guo et al. | |
| 2019/0222289 | A1* | 7/2019 | John Wilson | ....... H04W 72/046 |
| 2020/0112974 | A1* | 4/2020 | Sun | ....... H04L 1/0027 |
| 2021/0258813 | A1* | 8/2021 | Li | ....... H04W 72/53 |

FOREIGN PATENT DOCUMENTS

WO 2018147665 A1 8/2018

OTHER PUBLICATIONS

Office Action issued in the counterpart Indonesian Application No. P00202108389, mailed Aug. 25, 2023 (7 pages).
NTT DOCOMO: "Remaining issues on beam management", 3GPP TSG RAN WG1 Meeting #92bis R1-1805041; Sanya, China, Apr. 16-20, 2018 (4 pages).

(Continued)

*Primary Examiner* — Diane L Lo
(74) *Attorney, Agent, or Firm* — Osha Bergman Watanabe & Burton LLP

(57) ABSTRACT

A user equipment includes a reception unit that performs a measurement for determining an optimum beam from among a plurality of reception beams that is usable in the user equipment; and a control unit that selects, based on information of a past measurement by the reception unit, a reception beam to be used in the user equipment, upon receiving, by the reception unit, a signal including information indicating to update a configuration.

4 Claims, 9 Drawing Sheets

(56) References Cited

OTHER PUBLICATIONS

NTT DOCOMO: "Remaining issues on beam management", 3GPP TSG RAN WG1 Meeting #94bis R1-1811352; Chengdu, China, Oct. 8-12, 2018 (6 pages).
Ericsson: "Summary of views on beam measurement and reporting—v3", 3GPP TSG-RAN WG1 Meeting #94bis Tdoc R1-181996; Chengdu, China, Oct. 8-12, 2018 (16 pages).
Notice of Reasons for Refusal issued in Japanese Application No. 2021-506124 mailed on Jan. 4, 2023 (5 pages).
NEC, "Delay requirements for active TCI state switch", 3GPP TSG-RAN WG4 Meeting #90, R4-1900748, Athens, Greece, Feb. 25-Mar. 1, 2019 (4 pages).
Written Opinion for corresponding International Application No. PCT/JP2019/011926, mailed May 7, 2019 (4 pages).
International Search Report for corresponding International Application No. PCT/JP2019/011926, mailed May 7, 2019 (5 pages).
3GPP TS 38.214 V15.4.0; "3rd Generation Partnership Project; Technical Specification Group Radio Access Network; NR; Physical layer procedures for data (Release 15)"; Dec. 2018 (102 pages).
3GPP TS 38.133 V15.4.0; "3rd Generation Partnership Project; Technical Specification Group Radio Access Network; NR; Requirements for support of radio resource management (Release 15)"; Dec. 2018 (876 pages).
Office Action issued in the counterpart Chinese Application No. 201980094156.1, mailed Jun. 29, 2023 (18 pages).
Office Action issued in the counterpart Japanese Application No. 2021-506124, mailed Apr. 25, 2023 (5 pages).

\* cited by examiner

FIG.2

| QCL Types | QCL parameters |
|---|---|
| A | Doppler shift, Doppler spread, average delay, delay spread |
| B | Doppler shift, Doppler spread |
| C | Average delay, Doppler shift |
| D | Spatial Rx parameter (sQCL) |

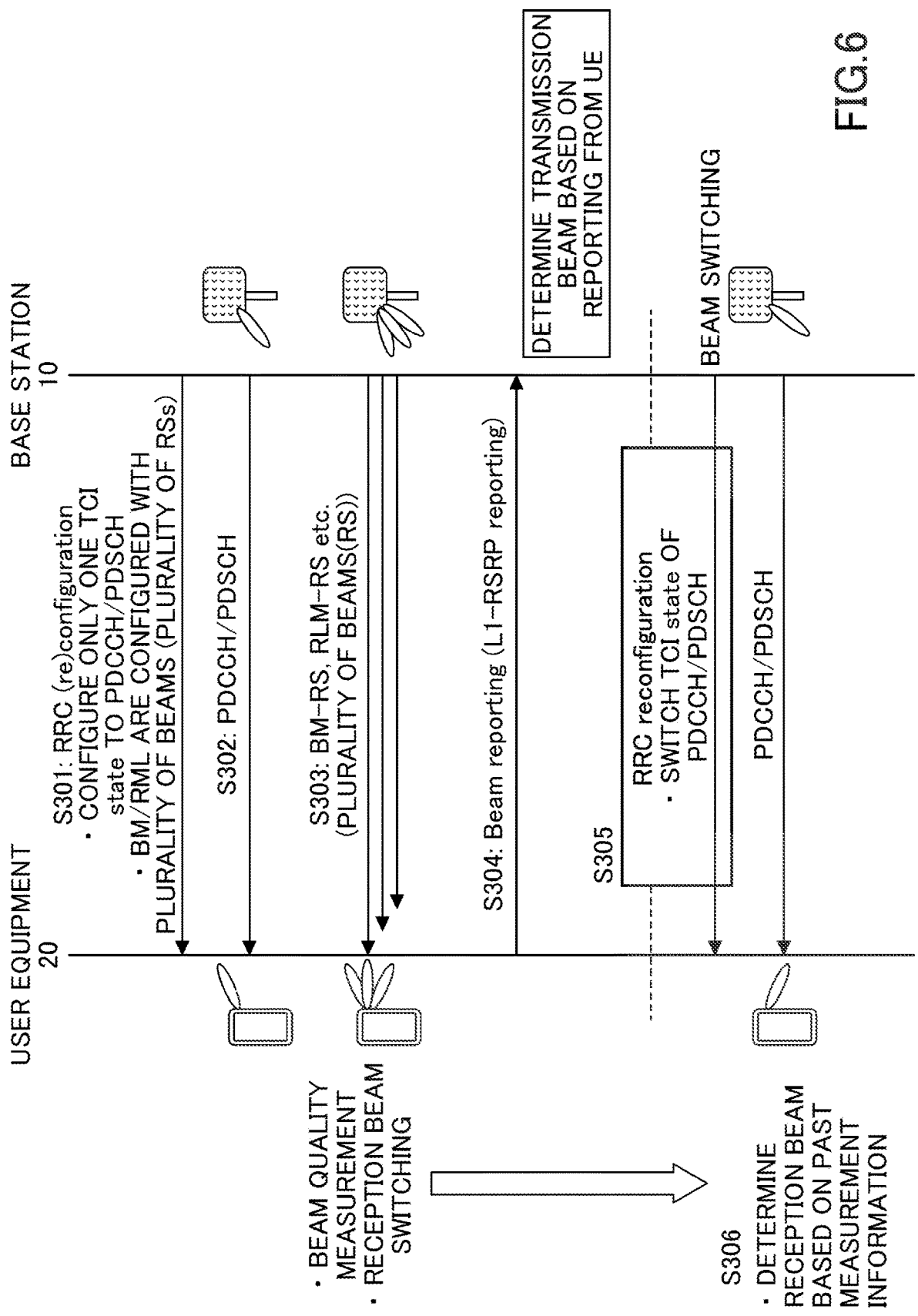

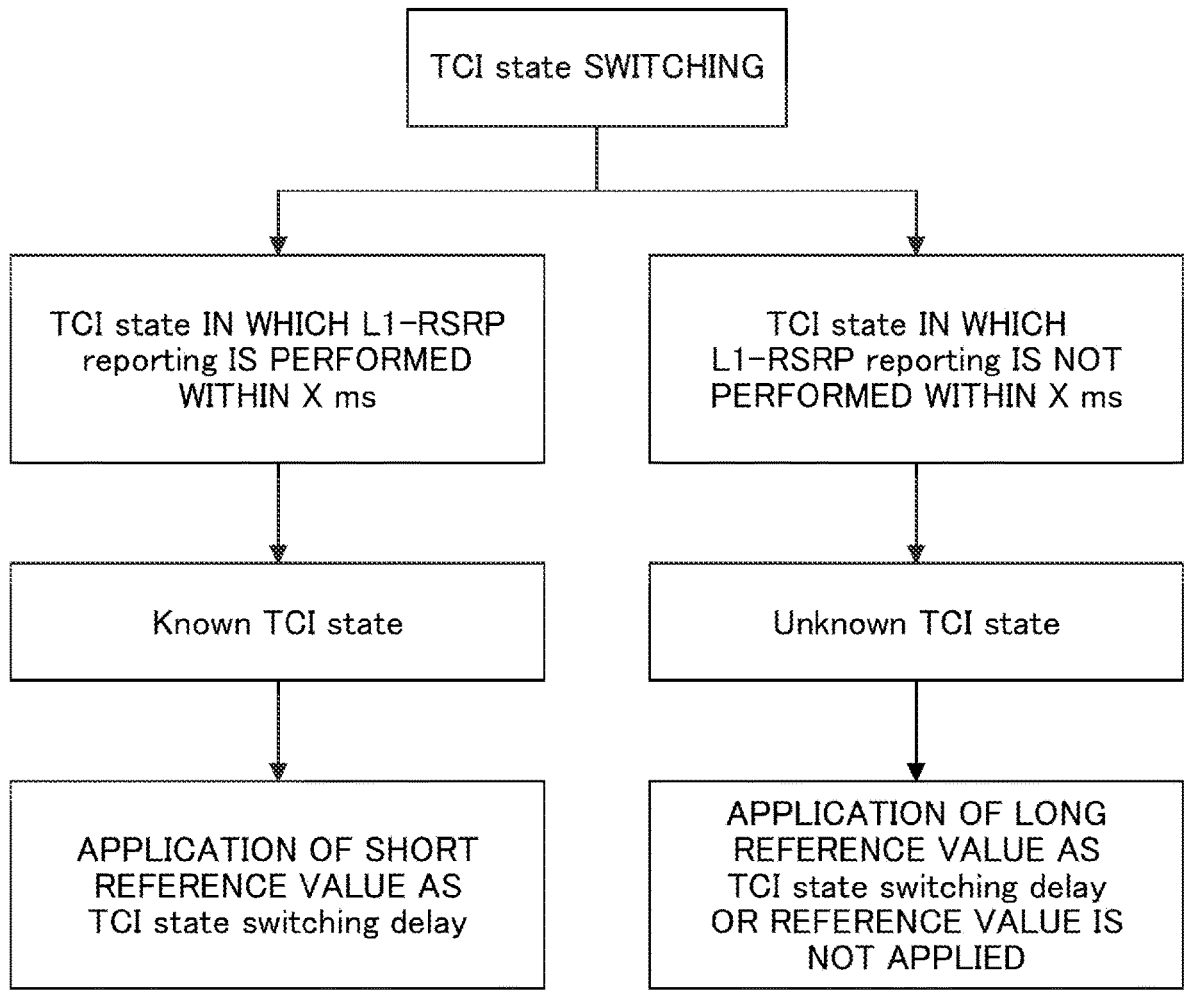

TERMINAL COMMUNICATION METHOD AND SYSTEM FOR TCI STSTEM SWITCHING

TECHNICAL FIELD

The present invention relates to user equipment and a communication method in a radio communication system.

BACKGROUND ART

In regard to the New Radio (NR), in order to secure coverage for communication using radio waves in a high frequency band, beamforming is applied to transmission of data on a Physical Downlink Shared Channel (PDSCH), transmission of a control signal on a Physical Downlink Control Channel (PDCCH), transmission of a synchronization signal and broadcast information on a Synchronization Signal/Physical Broadcast Channel (SS/PBCH) Block (SSB), and transmission of a reference signal (Channel State Information Reference Signal (CSI-RS)/Demodulation Reference Signal (DMRS)).

Beam management or beam control is important for communication using beams. For example, if there are two beams, a base station is to signal to user equipment which beam is used to transmit a signal. A Transmission Configuration Indication (TCI) state is specified to signal to user equipment a beam to be used or to signal to user equipment to switch to the other beam to be used.

PRIOR ART DOCUMENT

Non-Patent Document

Non-Patent Document 1: 3GPP TS 38.214 V15.4.0 (2018-12)
Non-Patent Document 2: 3GPP TS 38.133 V15.4.0 (2018-12)

SUMMARY OF THE INVENTION

Problem to be Solved by the Invention

With regard to switching of the TCI state that is assumed in an actual network operation, it is necessary to clarify an operation of a user equipment.

Means for Solving the Problem

According to an aspect of the invention, there is provided user equipment that includes a reception unit that performs a measurement for determining an optimum beam from among a plurality of reception beams that is usable in the user equipment; and a control unit that selects, based on information of a past measurement by the reception unit, a reception beam to be used in the user equipment, upon receiving, by the reception unit, a signal including information indicating to update a configuration.

Advantage of the Invention

According to an embodiment, a technology is provided that allows optimal network control and that allows stable communication to be maintained between a base station and user equipment.

BRIEF DESCRIPTION OF DRAWINGS

FIG. 2 is a diagram illustrating an example of types of QCL.

FIG. 6 is a diagram illustrating another operation example of solution 1.

FIG. 7 is a diagram illustrating an example of a process of switching a TCI state.

FIG. 8 is a diagram illustrating an example of changing a threshold value for determining whether past measurement information can be carried over.

EMBODIMENTS OF THE INVENTION

Figure 1:
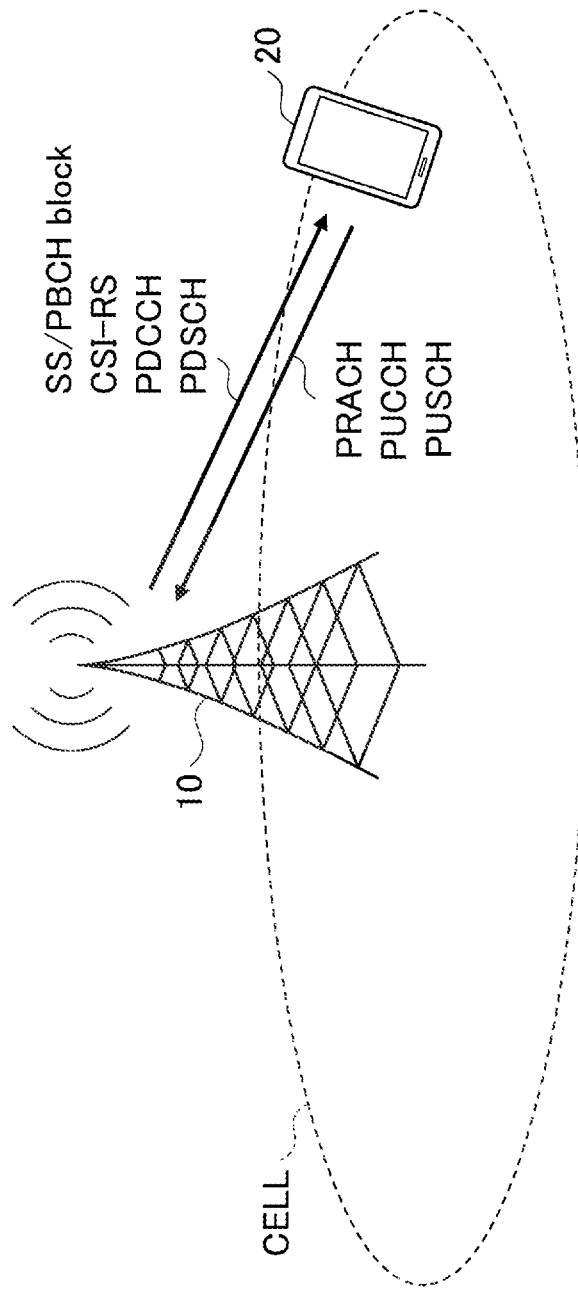
FIG. 1 is a configuration diagram of a communication system according to an embodiment.

In the following, embodiments of the present invention are described with reference to the drawings. The embodiments described below are merely examples, and embodiments to which the present invention is applied are not limited to the following embodiments.

In the embodiments of the present invention described below, terms used in existing LTE are used, such as Synchronization Signal (SS), Primary SS (PSS), Secondary SS (SSS), Physical Broadcast channel (PBCH), and Physical Random Access channel (PRACH). This is for convenience of description, and signals and functions similar to these may be referred to by other names. The above-described terms in NR correspond to NR-SS, NR-PSS, NR-SSS, NR-PBCH, NR-PRACH, and the like. However, even if a signal is used for NR, the signal is not always explicitly indicated as "NR-."

In embodiments of the present invention, a duplex method may be a Time Division Duplex (TDD) method, a Frequency Division Duplex (FDD) method, or any other method (e.g., Flexible Duplexing).

In the following description, a method of transmitting a signal using a transmit beam may be digital beamforming, in which a signal multiplied by a precoding vector (precoded with the precoding vector) is transmitted, or analog beamforming, in which beamforming is implemented using a variable phase shifter in an RF (Radio Frequency) circuit. Similarly, a method of receiving a signal using a receiving beam may be digital beamforming, in which a received signal is multiplied by a predetermined weight vector, or analog beamforming, in which beamforming is implemented using a variable phase shifter in an RF circuit. Hybrid beamforming combining digital beamforming and analog beamforming may be applied to transmission and/or reception. Transmitting a signal using a transmit beam may be transmitting the signal with a specific antenna port. Similarly, receiving a signal using a receiving beam may be receiving the signal with a specific antenna port. An antenna port refers to a logical antenna port or a physical antenna port defined by the 3GPP standard. The above-described precoding or beamforming may be referred to as a precoder, a spatial domain filter, or the like.

Note that a method of forming a transmit beam and receiving beam is not limited to the above-described methods. For example, in a base station 10 or user equipment 20 having multiple antennas, a method of changing an angle of each antenna may be used, a method of using a precoding vector and a method of changing the angle of the antenna may be used, a method of switching different antenna panels may be used, a method of combining multiple antenna panels may be used, or other methods may be used. For example, in a high frequency band, a plurality of mutually different transmit beams may be used. The use of multiple transmit beams is called multi-beam operation, and the use of a single transmit beam is called single-beam operation.

In the embodiments of the present invention, "configuring" a radio parameter or the like may include pre-configuring a predetermined value, or configuring the radio parameter signalled from the base station 10 or the user equipment 20.

FIG. 1 is a diagram illustrating a radio communication system according to an embodiment of the present invention. The radio communication system according to the embodiment of the present invention includes a base station 10 and user equipment 20, as depicted in FIG. 1. In FIG. 1, one base station 10 and one unit of the user equipment 20 are depicted. However, this is an example, and, for each of the devices, there may be a plurality of devices.

The base station 10 is a communication device that provides one or more cells and performs radio communication with the user equipment 20. A physical resource of a radio signal is defined in a time domain and a frequency domain, the time domain may be defined by a number of OFDM symbols, and the frequency domain may be defined by a number of sub-carriers or a number of resource blocks. The base station 10 transmits a synchronization signal and system information to the user equipment 20. A synchronization signal is, for example, NR-PSS and NR-SSS. A part of system information is transmitted, for example, by NR-PBCH, which is also called broadcast information. A synchronization signal and broadcast information may be periodically transmitted as an SS block (SS/PBCH block) consisting of a predetermined number of OFDM symbols. For example, the base station 10 transmits a control signal or data in DL (Downlink) to the user equipment 20 and receives a control signal or data in UL (Uplink) from the user equipment 20. The base station 10 and the user equipment 20 are capable of transmitting and receiving signals while performing beamforming. For example, as shown in FIG. 1, a reference signal transmitted from the base station 10 includes a Channel State Information Reference Signal (CSI-RS), and a channel transmitted from the base station 10 includes Physical Downlink Control Channel (PDCCH) and Physical Downlink Shared Channel (PDSCH).

The user equipment 20 is a communication device provided with a radio communication function, such as a smartphone, a cellular phone, a tablet, a wearable terminal, and a communication module for Machine-to-Machine (M2M). The user equipment 20 utilizes various communication services provided by a radio communication system by receiving a control signal or data in DL from the base station 10 and transmitting a control signal or data in UL to the base station 10. For example, as illustrated in FIG. 1, channels transmitted from the user equipment 20 include Physical Uplink Control Channel (PUCCH) and Physical Uplink Shared Channel (PUSCH).

In the New Radio (NR), in order to secure coverage for communications using radio waves in a high frequency band, beamforming is applied to transmission of data in a Physical Downlink Shared Channel (PDSCH), transmission of a control signal in a Physical Downlink Control Channel (PDCCH), transmission of a synchronization signal and broadcast information in a Synchronization Signal/Physical Broadcast Channel (SS/PBCH) Block (SSB), and transmission of a reference signal (Channel State Information Signal (CSI-RS)/Demodulation Reference Signal (DMRS)).

For example, in Frequency Range 2 (FR2), i.e., in a frequency band of millimeter wave higher than or equal to 24 GHz, 64 beams can be used, and in Frequency Range 1 (FR1), i.e., in a sub-6 GHz frequency band, 8 beams can be used.

For performing communication using a beam, beam management or beam control is important. For example, if there are two beams, the base station 10 may need to signal to the user equipment 20 which beam is used to transmit the signal. A Transmission Configuration Indication (TCI) state is specified so as to transmit, to the user equipment 20, a notification of the beam to be used, or to transmit, to the user equipment 20, a notification of switching of a beam to be used.

Details to be signaled by a TCI state include Quasi-Co-Location (QCL) that indicates it is possible to assume that one reference signal (RS) and one channel are identical radio channels, or the one reference signal (RS) and the one channel have the same radio property (the same beam). QCL is specified in Non-Patent Document 1.

For example, the fact that a reference signal, such as a CSI-RS (or SS/PBCH) and a PDSCH, that is a channel for transmitting data, are QCL implies that the reference signal and the data have a relationship such that the reference signal and the data are transmitted with a same beam.

As shown in FIG. 2, four types of QCL are defined from A to D. For signaling beam information, QCL Type D is mainly used. QCL Type D implies that transmissions by the same beam. Other than that, for example, QCL Type A is used for signaling colocation, for example, whether the base stations 10 are located at a same location.

(Beam Management Function)

In NR, a beam management function is specified for selecting an optimum pair of a beam used by the base station 10 for transmission and a beam used by the user equipment for reception.

Figure 3:
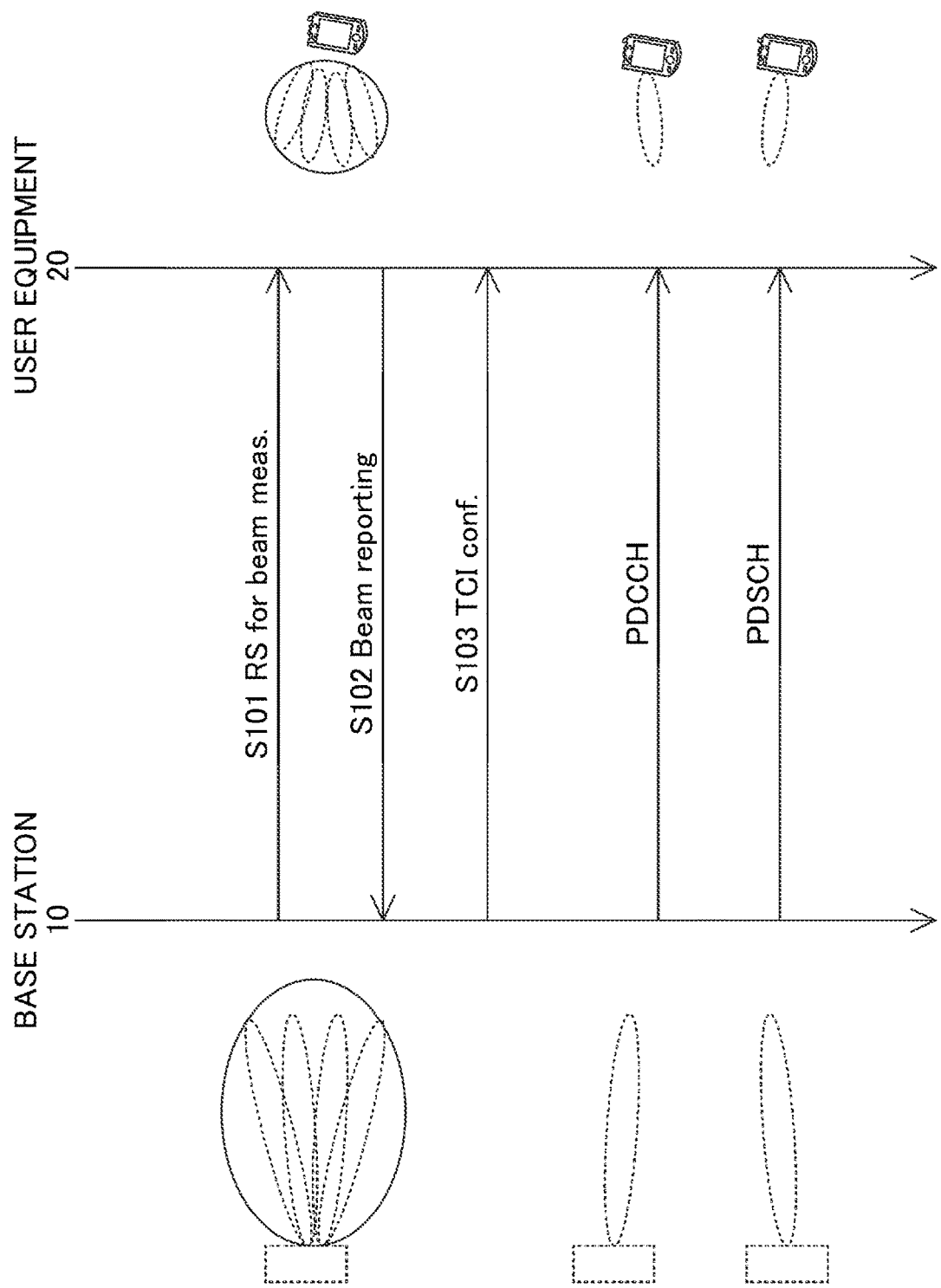
FIG. 3 is a diagram illustrating an example of an NR beam management process.

FIG. 3 is a diagram illustrating an example of NR beam management processing. In step S101 of FIG. 3, the base station 10 signals, to the user equipment 20, a configuration of a reference signal and a configuration of reporting. In step S102, the user equipment 20 measures the quality of a beam (RSRP: Reference Signal Received Power) using a reference signal transmitted in the signaled resource, and the user equipment 20 transmits the measured quality to the base station 10.

The base station 10 calculates an optimum beam based on quality of each beam reported from the user equipment 20, and the base station 10 signals, to the user equipment 20, information indicating that data and/or a control signal is transmitted with the calculated beam, as a TCI state (step S103).

As a function that can be used in a beam management procedure, an RS resource configuration function, a Beam reporting function, and a Beam indication function are known, which are described below.

(RS Resource Configuration Function)

The RS resource configuration function is a function for configuring a reference signal used for beam management (beam quality reporting: beam reporting/L1-RSRP reporting) by RRC signaling. Here, as a reference signal used for beam quality reporting, SSB or CSI-RS can be configured. Furthermore, supported periodicities of a CSI-RS include, aperiodic, semi-persistent, and periodic. Furthermore, as a function of optimizing the receiving beam (Rx beam) in the user equipment 20, repetition in which the base station 10 repeatedly transmits a CSI-RS with the same beam, can be configured by RRC signaling (CSI-RS with repetition on or off).

(Beam Reporting Function)

A Beam reporting function is a function for reporting beam quality using the framework of the CSI-RS report. The user equipment 20 reports beam quality to the base station 10. Supported reporting periodicities include, aperiodic, semi-persistent, and periodic.

(Beam Indication Function)

By the beam indication function, a Transmission Configuration Indication-state (TCI-state) can be configured. The TCI-state is for signaling, from a network to the user equipment 20, information indicating the beams to be used by the base station 10 for transmission of a reference signal, data, and a control signal.

(TCI State Configuration Method/Switching Method)

Figure 4:
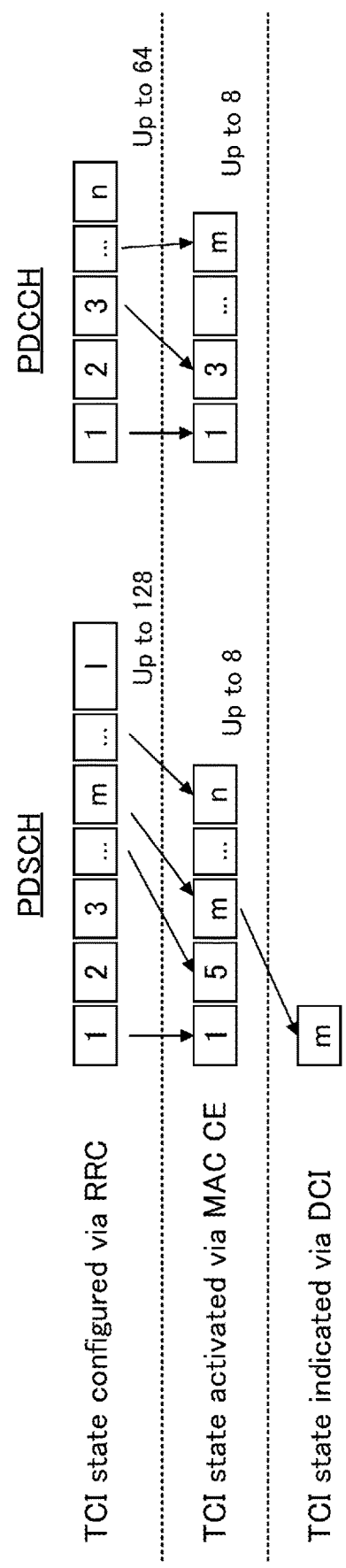
FIG. 4 is a diagram illustrating an example of a TCI state configured in user equipment.

FIG. 4 is a diagram illustrating an example of a TCI state configured for the user equipment 20.

By Radio Resource Control (RRC) signaling, up to 128 TCI states can be configured for PDSCH in the user equipment 20. Additionally, by RRC signaling, up to 64 TCI states can be configured for PDCCH in the user equipment 20 (The TCI states for PDCCH are a subset of the TCI states configured for PDSCH).

With respect to the TCI states for the PDCCH, it is possible to activate up to eight TCI states by a Medium Access Control Control Element (MAC CE) out of the TCI states configured by the RRC signaling in the user equipment 20, and it is possible to deactivate the activated TCI state. The user equipment 20 monitors the active TCI state.

With respect to the TCI states for the PDSCH, it is possible to activate up to eight TCI states by the Medium Access Control Control Element (MAC CE) out of the TCI states configured by the RRC signaling in the user equipment 20, and it is possible to deactivate the activated TCI state. Furthermore, the base station 10 can specify a TCI state of the PDSCH by Downlink Control Information (DCI) among the TCI states activated by the MAC CE. In this case, the user equipment 20 receives data transmitted by PDSCH assuming the TCI state designated by the DCI.

The operation of the user equipment 20 during switching of the TCI state is currently discussed in RAN 4 of the 3GPP.

(Problem)

As an operation at the time of updating (switching) a TCI state that is configured in the user equipment 20, an operation of updating the TCI state based on DCI (DCI based switching) is clarified for updating the TCI state for PDSCH, and an operation for updating a TCI state based on MAC CE (MAC CE based switching) is clarified for updating the TCI state for PDCCH. However, an operation for updating a TCI state based on RRC signaling in the user equipment 20 (for example, a case of configuring only one TCI state by RRC signaling in the user equipment 20) is not clarified. Additionally, an operation for updating a TCI state for PDSCH based on MAC CE in the user equipment 20 (for example, a case of activating only one TCI state by the MAC CE) is not clarified.

Furthermore, it has been discussed to define a requirement on a time for the user equipment 20 to update a TCI state (TCI state switching delay). In particular, it has been discussed to classify operations of the user equipment 20 according to whether an updated TCI state is known or unknown to the user equipment 20. However, a condition for classifying known/unknown is not clarified.

It has been studied to adopt, as a condition for classifying known/unknown, a condition as to whether the user equipment 20 has performed a detection with a TCI state prior to updating the TCI state (for example, if L1-RSRP reporting is performed within x ms immediately before the update, the state is known).

However, if the condition as to whether L1-RSRP reporting is performed within x ms is uniformly defined as a condition for classifying known/unknown, the threshold value for the determination (i.e., x ms) may be too large, for example, in a case in which the reporting periodicity is short, and the threshold value for the determination (x ms) may be too small in a case in which the reporting periodicity is long. As a result, an operation of the user equipment 20 may be adversely affected.

Furthermore, if the user equipment 20 has performed L1-RSRP reporting at a time that is before the current time by a time length slightly longer than x ms and the user equipment 20 is not performing L1-RSRP reporting at the current time, or if the user equipment 20 is performing a measurement operation other than L1-RSRP reporting using the updated TCI state, an operation for the unknown may be applied as an operation of the user equipment 20, even if the updated TCI state is known to the user equipment 20.

(Solution 1)

According to solution 1, when the base station 10 is to change a beam to be used to transmit data, a control signal, a synchronization signal, a reference signal, or the like, the user equipment 20 selects a reception beam based on past measurement information, under the condition described below (the condition 1 or the condition 2).

(Condition 1) A case in which RRC reconfiguration is performed.

(Condition 2) A case in which no explicit notification of information on an updated transmit beam is provided.

Here, when the base station 10 updates a beam to be transmitted, the user equipment 20 is to update a beam to be used for reception. In particular, if a requirement on a time for updating a TCI state is to be defined, it is necessary to consider a time for updating a beam to be used by the user equipment 20 for reception. Actually, if the user equipment 20 has known an updated beam, the user equipment 20 has already known a reception beam to be used for reception, and, thus, the user equipment 20 can update the reception beam without an additional delay. In a case where the user equipment 20 has not measured an updated beam, it is unknown which reception beam of the user equipment 20 is optimal. Accordingly, for example, if the user equipment 20 can configure a set of eight reception beams, an operation is required such that measurements are performed for all the eight beams and an optimum beam is determined. As a result, an additional delay occurs. Accordingly, if a requirement on a time for updating a TCI state is to be defined, it is necessary to consider a time for determining a reception beam of the user equipment 20.

As the past measurement information to be referred to by the user equipment 20, measurement information obtained by at least one of the following measurement operations can be applied.

L1-RSRP measurement

Rx beam management (for example, a measurement of CSI-RS for which repetition is configured)

Radio Resource Management (RRM) measurement

Radio Link Monitoring

Beam Failure Detection, Candidate Beam Detection

In the following, details of solution 1 are described.

When the base station 10 performs RRC reconfiguration, the user equipment 20 may determine, based on past measurement information, a reception beam of the user equipment 20 to be used for reception of a data signal transmitted on PDSCH, a control signal transmitted on PDCCH, a synchronization signal (e.g., SSB), and a reference signal (CSI-RS).

Here, specifically, determining the reception beam based on the past measurement information may be as follows.

The user equipment 20 receives the data signal, the control signal, the synchronization signal, and the reference signal described above, without newly performing beam switching (beam sweeping) for determining the reception beam. For example, in the requirements on the measurement period (Non-Patent 2) for Radio Link Monitoring (RLM), Beam Failure Detection (BFD), and L1-RSRP reporting, a scaling factor for beam switching need not be applied (N=1). Alternatively, for updating a TCI state of PDCCH/PDSCH, no additional time (in addition to the delay for the RRC reconfiguration) is required for updating a reception beam of the user equipment 20, or the time required for updating a reception beam may be the same as the time required for the RRC reconfiguration.

The user equipment 20 may complete reception beam switching (beam sweeping) by taking fewer measurements than a number of times of measurements in a case in which there is no measurement information. For example, in the requirements on the measurement period for RLM, BFD, and L1-RSRP reporting (Non-Patent Document 2), a small value may be applied, as the scaling factor for the beam switching (1<N<8). Alternatively, if the TCI state of the RS measured by the user equipment 20 prior to the RRC reconfiguration is the same as the TCI state configured in the user equipment 20 after the RRC reconfiguration, the user equipment 20 may complete updating the TCI state with a small number of times of measurements (e.g., M times of measurements, where M=1, 2, . . . ).

When the base station 10 performs RRC reconfiguration, a condition for allowing the user equipment 20 to determine a reception beam of the user equipment 20 based on past measurement information (a condition that the user equipment 20 is allowed to retain past measurement information) may be a condition that a synchronization signal configuration/a reference signal configuration used for measurement of received quality is not changed.

Figure 5:
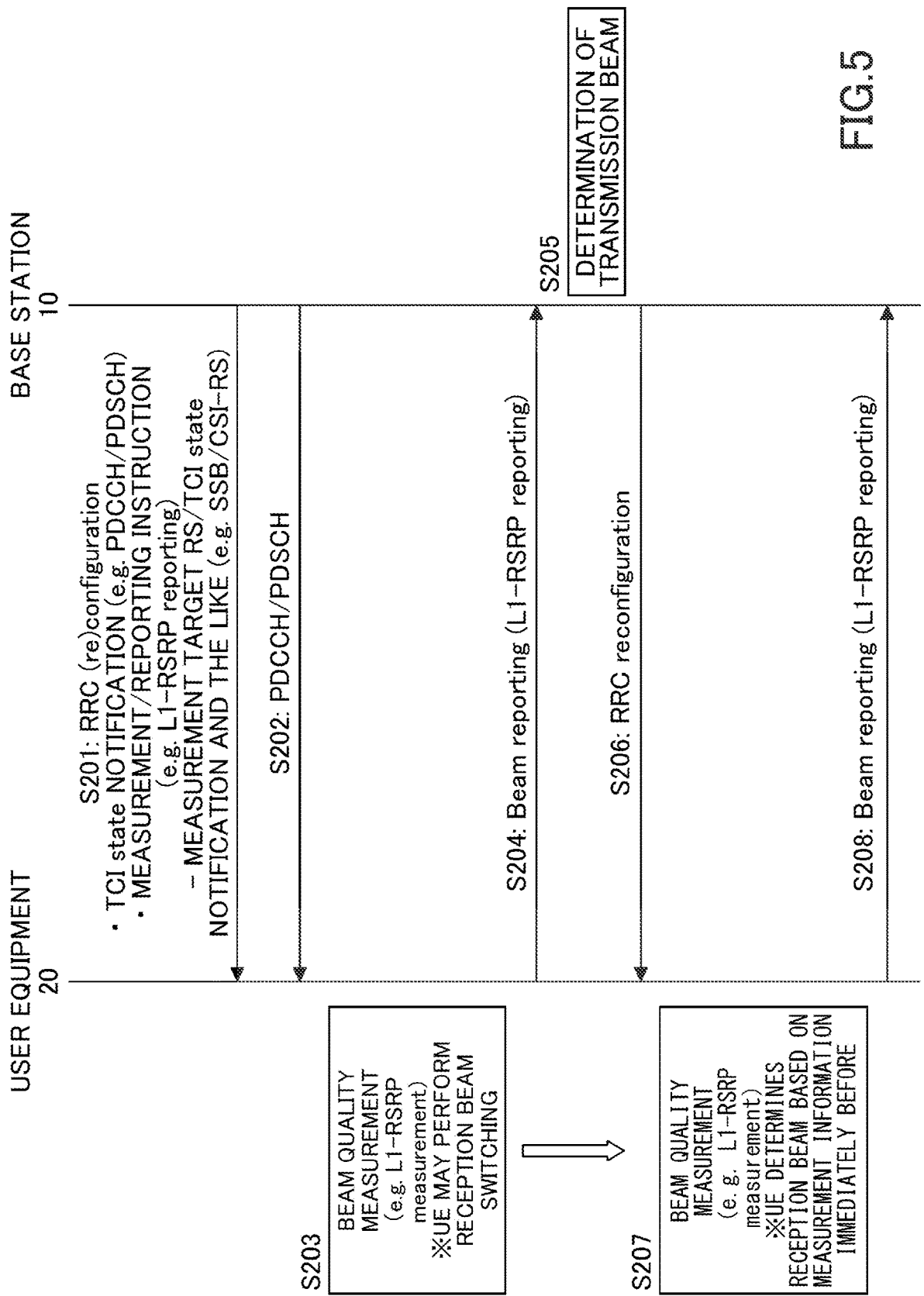
FIG. 5 is a diagram illustrating an operation example of solution 1.

FIG. 5 is a diagram illustrating an example of an operation of the solution 1.

First, at step S201, the base station 10 transmits, to the user equipment 20, a control signal including an RRC configuration message. The RRC configuration message may include a TCI state for PDCCH and a TCI state for PDSCH, an instruction for measurement and/or reporting (e.g., L1-RSRP reporting), an RS to be measured (e.g., SSB or CSI-RS), and the like. Furthermore, the RRC configuration message may be transmitted once, or the RRC configuration message may be divided and the RRC messages may be transmitted in several times. Next, the base station 10 transmits a control signal of PDCCH and data of PDSCH using the beam notified by the TCI state (step S202). Subsequently, the user equipment 20 performs beam quality measurement (e.g., L1-RSRP measurement). At this time, the user equipment 20 may perform reception beam switching. Subsequently, at step S204, the user equipment 20 performs Beam reporting (L1-RSRP reporting). The base station 10 that receives the beam quality report at step S204 determines a new transmit beam at step S205. Subsequently, in order to communicate with the user equipment 20 using the new transmit beam, the base station 10 transmits an RRC reconfiguration message to the user equipment 20 at step S206. Next, at step S207, the user equipment 20 performs beam quality measurement (e.g., L1-RSRP measurement). In this case, the user equipment 20 determines the reception beam based on the measurement information immediately before, i.e., the measurement information of the beam quality obtained at step S203. Subsequently, at step S208, the user equipment 20 performs Beam reporting.

As described above, according to the example of the operation illustrated in FIG. 5, the user equipment 20 has already known which reception beam is to be used, as a result of the beam quality measurement performed at step S203. Accordingly, the user equipment 20 can determine, for the beam quality measurement at step S207, the reception beam without an additional delay.

FIG. 6 is a diagram illustrating another example of the operation of the solution 1. The example operation illustrated in FIG. 6 is an example of an operation in a case in which only one state is configured by RRC as the TCI state of PDCCH/PDSCH.

First, at step S301, the base station 10 transmits an RRC configuration message to the user equipment 20. In this RRC configuration message, only one TCI state is set for PDCCH/PDSCH. For BM/RLM, a plurality of beams (a plurality of RSs) may be configured. The user equipment 20 that receives the RRC configuration message configures only one TCI state for PDCCH/PDSCH.

Next, the base station 10 transmits, to the user equipment 20 (S302), a signal of PDCCH and a signal of PDSCH with one beam configured at step S301. The user equipment 20 receives a signal from the base station 10 while assuming the one beam reported at S301.

Next, it is assumed that the user equipment 20 moves. As a result, a case is assumed in which the optimum beam is different from the previous optimum beam. Accordingly, the base station 10 periodically transmits, other than the one beam for transmitting the signal of PDCCH and the signal of PDSCH, a plurality of reference signals (beams) (S303), such as a Beam Management Reference signal (BM-RS) and a Radio Link Monitoring Reference signal (RLM-RS). The user equipment 20 periodically performs beam quality measurement, and the user equipment 20 reports the measurement result to the base station 10 (S304).

The base station 10 changes, based on the report from the user equipment 20, the one beam used for transmitting the signal of PDCCH and the signal of PDSCH to the user equipment 20. In this case, the base station 10 transmits an RRC reconfiguration message to the user equipment 20 (S305). Here, normally, the user equipment 20 that has received the RRC reconfiguration message resets the configuration. However, in this example of the operation, even after receiving the RRC reconfiguration message, the user equipment 20 retains the result of the measurement of the plurality of beams transmitted at step S303, as it is.

Accordingly, at step S306, the user equipment 20 can determine a reception beam based on the measurement result of the past beam quality measurement.

In the solution 1, even if there is no explicit notification of information on the updated transmit beam from the base station 10, the user equipment 20 may determine the reception beam based on the past measurement. Here, as the case in which there is no explicit notification of the information on the updated transmit beam, at least the following cases are assumed.

a case in which a plurality of TCI states is configured by RRC signaling for PDSCH/PDCCH, and activation based on MAC CE is not performed (in this case, the user equipment 20 assumes the QCL assumption that is the same as that of the SSB detected at an initial access)

a case in which only one TCI state is activated by MAC CE as the TCI state of PDSCH (a case in which no notification by DCI is provided)

a case in which no TCI state of PDSCH is configured (in this case, the user equipment 20 assumes an RS that is the same as that of the active TCI state of PDCCH, as the QCL assumption of PDSCH)

(Solution 2)

According to solution 2, not limited to the above-described conditions 1 and 2, when a transmit beam of the base station 10 is updated, a threshold value for determining whether the user equipment 20 is allowed to carry over past measurement information to determine a reception beam (whether the past measurement information is determined to be valid measurement information) is changed depending on a condition. Here, the change according to the condition may be a change performed base on a notification from the base station 10 to the user equipment 20. Alternatively, the change may be a change performed based on a notification from the user equipment 20 to the base station 10. Alternatively, the change may be a change according to a condition described in a technical specification document.

The above-described case in which the user equipment 20 is allowed to carry over the past measurement information to determine the reception beam may be a case of the known, in which the user equipment 20 has measured the reception beam in the past. A case in which the user equipment 20 is not allowed to carry over the past measurement information may be a case of the unknown, in which the user equipment 20 has not measured the reception beam in the past.

Furthermore, as the above-described reference used in the determination, the following conditions may be included, in addition to the condition as to whether the user equipment 20 performs reporting of beam quality (L1-RSRP reporting) immediately before:

whether Rx beam management is performed regardless of whether L1-RSRP reporting is performed (i.e., whether "repetition" is set for CSI-RS)

whether RRM measurement, RLM, BFD, CBD, or a combination thereof is performed whether a Tracking RS (TRS) is configured as a TCI state of PDCCH/PDSCH, or whether measurement based on TRS is performed Furthermore, the change according the condition may be at least one of the following changes:

a change based on a notification (signaling) from the base station 10 to the user equipment 20 (from the user equipment 20 to the base station 10). Based on this notification, a different requirement (reference) may be applied, as the time for changing a transmit beam in the base station 10 (TCI state switching delay). Furthermore, for this notification, the existing signalling/UE capability may be used.

a change according to a condition described in a technical specification document. In accordance with the condition, a different requirement (reference) may be applied, as the time for changing a transmit beam in the base station 10 (TCI state switching delay). As the condition described in the technical specification document, at least, the following conditions can be considered. A periodicity of beam reporting or a periodicity of a resource used for measurement. A type of a cell (e.g., PCell/PSCell, or SCell). Note that the above-described threshold value for the determination may be a single value, or a plurality of values.

FIG. 7 is a diagram illustrating an example of a process of switching a TCI state. In the example illustrated in FIG. 7, a case in which L1-RSRP reporting from the user equipment 20 is made within x ms immediately before the switching is the case in which an updated TCI state is known the user equipment 20. A case in which L1-RSRP reporting from the user equipment 20 is not made within x ms immediately before the switching is the case in which an updated TCI state is unknown to the user equipment 20.

Furthermore, in the example illustrated in FIG. 7, a condition for changing a threshold value for determining whether the user equipment 20 is allowed to carry over past measurement information for determining a reception beam is defined based on the beam reporting (L1-RSRP reporting) periodicity, as the reference. Specifically, as illustrated in FIG. 8, if the Reporting periodicity is less than or equal to 80 ms, the threshold value for the determination is 80 ms. Furthermore, if the Reporting periodicity is greater than 80 ms and less than or equal to 160 ms, the threshold value for the determination is 320 ms. Furthermore, if the Reporting periodicity is greater than 160 ms, the threshold value for the determination is 640 ms.

The threshold value for the determination is set, as described above. In the example of the process of FIG. 7, if L1-RSRP reporting is performed within x ms, it is determined that an updated TCI state is known to the user equipment 20, and a short reference value is applied as the TCI state switching delay. Furthermore, if L1-RSRP reporting is not performed within x ms, it is determined that an updated TCI state is unknown to the user equipment 20, and a long reference value is applied as the TCI state switching delay, or no reference value is applied.

The above-described solutions 1 and 2 are methods for determining a reception beam of the user equipment 20. However, the above-described solutions 1 and 2 may be applied to a determination of a transmit beam of the user equipment 20.

Furthermore, the above-described operation of the user equipment 20 during switching of the TCI state may be applied to the Interruption requirement (the requirement on the number of slots and symbols for allowing the user equipment 20 to be unable to transmit and receive data/control signals due to the operation).

(Device Configuration)

Next, an example of the functional configuration of the base station 10 and the user equipment 20 for performing the processes and operations described above is described. The base station 10 and the user equipment 20 include functions for implementing the above-described embodiments. However, each of the base station 10 and the user equipment 20 may include only some of the functions in the embodiments. Note that the base station 10 and the user equipment 20 may be collectively referred to as a communication device.

<Base Station Apparatus 10>

Figure 9:
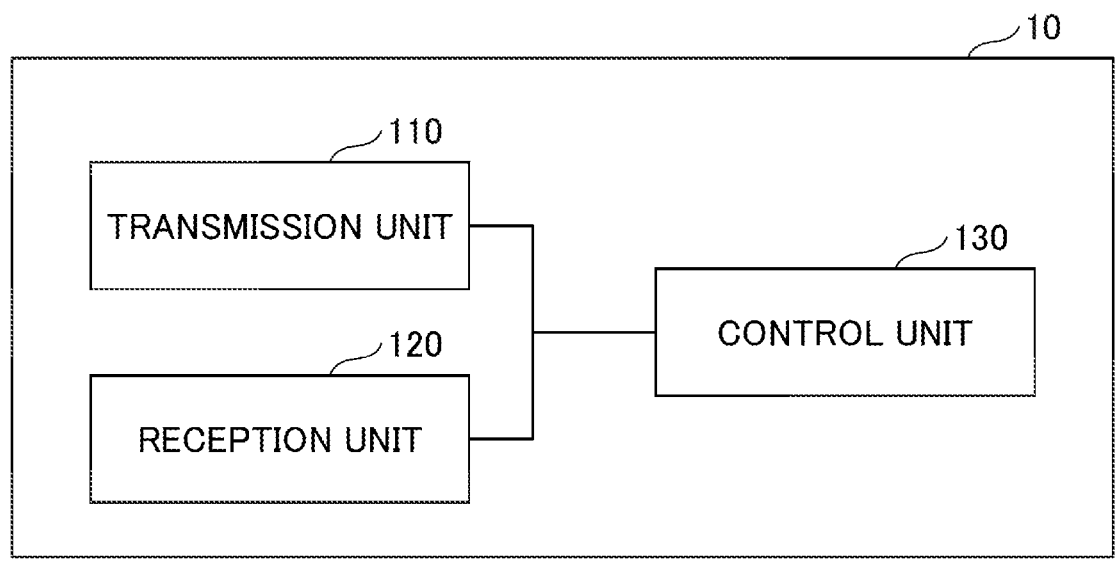
FIG. 9 is a diagram illustrating an example of the functional configuration of user equipment.

FIG. 9 is a diagram illustrating an example of the functional configuration of the base station 10. As illustrated in FIG. 9, the base station 10 includes a transmission unit 110, a reception unit 120, and a control unit 130. The functional configuration illustrated in FIG. 9 is merely one example. The functional division and names of functional units may be any division and names, provided that the operations according to the embodiments of the present invention can be performed.

The transmission unit 110 includes a function for generating a transmit signal from transmit data, and the transmission unit 110 transmits the transmit signal through radio. The reception unit 120 receives various types of signals through radio, and the reception unit 120 obtains a higher layer signal from the received physical layer signal. Furthermore, the reception unit 120 includes a measurement unit that performs measurement of a received signal to obtain received power, and so forth.

The control unit 130 controls the base station 10. Note that a function of the control unit 130 related to transmission may be included in the transmission unit 110 and a function of the control unit 130 related to reception may be included in the reception unit 120.

In the base station 10, the control unit 130 calculates an optimum beam based on the quality of each beam reported from the user equipment 20, and the control unit 130 generates, as a TCI state, information indicating that data and/or control signals are transmitted with the calculated beam. The transmission unit 110 transmits a signal including a TCI state to the user equipment 20.

Furthermore, in the base station 10, the transmission unit 110 periodically transmits a plurality of reference signals (beams) such as a Beam Management Reference signal (BM-RS), and/or a Radio Link Monitoring Reference signal (RLM-RS), in addition to one beam for transmitting a signal of PDCCH and a signal of PDSCH.

<User Equipment 20>

Figure 10:
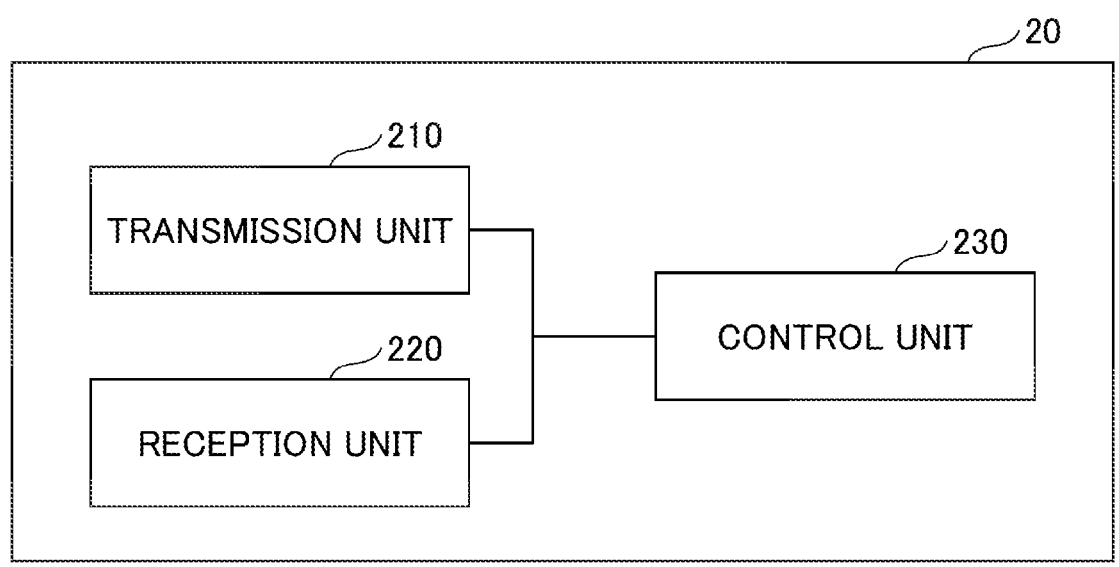
FIG. 10 is a diagram illustrating an example of the functional configuration of a base station.
Figure 11:
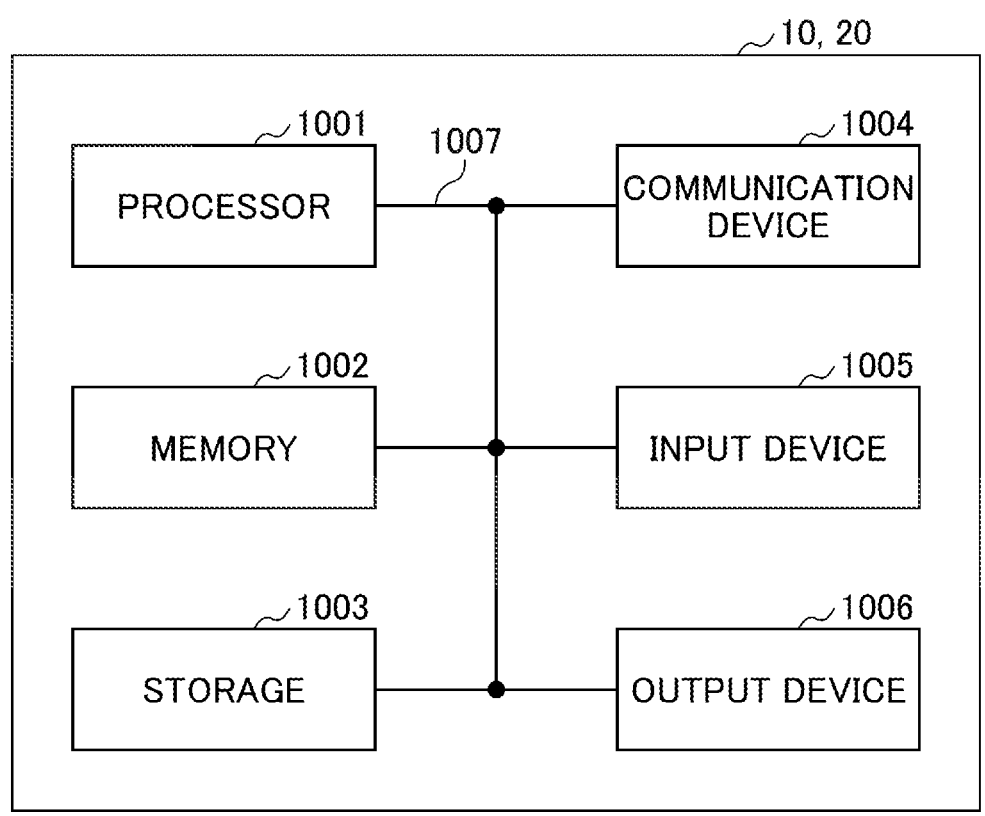
FIG. 11 is a diagram illustrating an example of the hardware configuration of user equipment and a base station.

FIG. 10 is a diagram illustrating an example of the functional configuration of the user equipment 20. As illustrated in FIG. 10, the user equipment 20 includes a transmission unit 210, a reception unit 220, and a control unit 230. The functional configuration illustrated in FIG. 10 is merely an example. The functional division and names of functional units may be any division and names, provided that the operation according to the embodiments can be performed.

The transmission unit 210 includes a function for generating a signal to be transmitted to the base station 10 and transmitting the signal through radio. The reception unit 220 includes a function for receiving various types of signals transmitted from the base station 10 and obtaining, for example, higher layer information from the received signals. The reception unit 220 includes a measurement unit that measures a received signal to obtain a received power.

The control unit 230 controls the user equipment 20. The function of the control unit 230 related to transmission may be included in the transmission unit 210, and the function of the control unit 230 related to reception may be included in the reception unit 220.

In the user equipment 20, the reception unit 220 measures quality of a beam (RSRP: Reference Signal Received Power) using a reference signal transmitted by a resource signaled by the base station 10, and the transmission unit 210 transmits the measured quality to the base station 10.

Furthermore, in the user equipment 20, the control unit 230 can configure 128 TCI states for PDSCH based on RRC signaling from the base station 10. Furthermore, the control unit 230 can configure 64 TCI states for PDCCH based on RRC signaling from the base station 10.

Furthermore, for the TCI states for PDCCH, the control unit 230 can activate, from among the TCI states configured by the control unit 230 based on the RRC signaling, up to 8 TCI states based on Medium Access Control Control Element (MAC CE), and the control unit 230 can deactivate the activated TCI states. The reception unit 220 of the user equipment 20 monitors an activated TCI state.

Furthermore, for the TCI states for PDSCH, the control unit 230 can activate, from among the TCI states configured by the control unit 230 based on the RRC signaling, up to 8 TCI states based on Medium Access Control Control Element (MAC CE), and the control unit 230 can deactivate the activated TCI states. Furthermore, the control unit 230 can specify, from among the TCI states activated by the MAC CE, a TCI state for PDSCH by using Downlink Control Information (DCI).

Furthermore, when the base station 10 changes a beam used to transmit data, a control signal, a synchronization signal, a reference signal, and the like, the control unit 230 of the user equipment 20 determines a reception beam based on past measurement information. Note that, even if the reception unit 220 receives an RRC reconfiguration message from the base station 10, the control unit 230 of the user equipment 20 can maintain a result of measurement of a plurality of beams, as it is.

Furthermore, when a transmit beam in the base station 10 is changed, the control unit 230 of the user equipment 20 can change, according to a condition, a threshold value for determining whether past measurement information can be carried over for determining a reception beam (whether the past measurement information can be determined to be valid measurement information).

<Hardware Configuration>

The block diagrams (FIG. 9 to FIG. 10) used in describing the above embodiments show blocks of functional units. These functional blocks (components) are implemented by any combination of at least one of hardware and software. In addition, the implementation method of each functional block is not particularly limited. That is, each functional block may be implemented using a single device that is physically or logically combined, or may be implemented by directly or indirectly connecting two or more devices that are physically or logically separated (e.g., using wire or radio) and using these multiple devices. The functional block may be implemented by combining software with the above-described one device or the above-described plurality of devices. Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, and so forth. For example, a functional block (component) that functions to transmit is called a transmitting unit or a transmitter. In either case, as described above, the implementation method is not particularly limited.

For example, the base station 10 and the user equipment 20 according to an embodiment of the present invention may function as computers performing the process of the radio communication according to the embodiment of the present invention. FIG. 7 is a diagram illustrating an example of a hardware configuration of the base station 10 and the user equipment 20 according to the embodiment. Each of the above-described base station 10 and user equipment 20 may be physically configured as a computer device including a processor 1001, a memory 1002, a storage 1003, a communication device 1004, an input device 1005, an output device 1006, a bus 1007, and so forth.

Note that, in the following description, the term "device" can be replaced with a circuit, a device, a unit, and so forth. The hardware configuration of the base station 10 and the user equipment 20 may be configured to include one or more of the devices depicted in the figure, which are indicated by 1001 through 1006, or may be configured without some devices.

Each function of the base station 10 and the user equipment 20 is implemented by loading predetermined software (program) on hardware, such as the processor 1001 and the memory 1002, so that the processor 1001 performs computation and controls communication by the communication device 1004, and at least one of reading and writing of data in the memory 1002 and the storage 1003.

The processor 1001, for example, operates an operating system to control the entire computer. The processor 1001 may be configured with a central processing unit (CPU: Central Processing Unit) including an interface with a peripheral device, a control device, a processing device, a register, and so forth.

Additionally, the processor 1001 reads a program (program code), a software module, data, or the like from at least one of the storage 1003 and the communication device 1004 to the memory 1002, and executes various processes according to these. As the program, a program is used which causes a computer to execute at least a part of the operations described in the above-described embodiment. For example, the control unit 130 of the base station 10 may be implemented by a control program that is stored in the memory 1002 and that is operated by the processor 1001. While the various processes described above are described as being executed in one processor 1001, they may be executed simultaneously or sequentially by two or more processors 1001. The processor 1001 may be implemented by one or more chips. The program may be transmitted from a network via a telecommunications line.

The memory 1002 is a computer readable storage medium, and, for example, the memory 1002 may be formed of at least one of a Read Only Memory (ROM), an Erasable Programmable ROM (EPROM), an Electrically Erasable Programmable ROM (EEPROM), a Random Access Memory (RAM), and the like. The memory 1002 may be referred to as a register, a cache, a main memory (main storage device), or the like. The memory 1002 may store a program (program code), a software module, and so forth, which can be executed for implementing the radio communication method according to the embodiments of the present disclosure.

The storage 1003 is a computer readable storage medium and may be formed of, for example, at least one of an optical disk, such as a Compact Disc ROM (CD-ROM), a hard disk drive, a flexible disk, an optical magnetic disk (e.g., a compact disk, a digital versatile disk, a Blu-ray (registered trademark) disk), a smart card, a flash memory (e.g., a card, a stick, a key drive), a floppy (registered trademark) disk, a magnetic strip, and so forth. The storage 1003 may be referred to as an auxiliary storage device. The above-described storage medium may be, for example, a database including at least one of the memory 1002 and the storage 1003, a server, or any other suitable medium.

The communication device 1004 is hardware (transmitting and receiving device) for performing communication between computers through at least one of a wired network and a wireless network, and is also referred to, for example, as a network device, a network controller, a network card, a communication module, or the like. The communication device 1004 may be configured to include, for example, a high frequency switch, a duplexer, a filter, a frequency synthesizer, and the like, to implement at least one of frequency division duplex (FDD: Frequency Division Duplex) and time division duplex (TDD: Time Division Duplex).

The input device 1005 is an input device (e.g., a keyboard, mouse, microphone, switch, button, or sensor) that receives an external input. The output device 1006 is an output device (e.g., a display, speaker, or LED lamp) that implements an external output. The input device 1005 and the output device 1006 may have an integrated configuration (for example, a touch panel).

Each device, such as the processor 1001 and the memory 1002, is also connected by the bus 1007 for communicating information. The bus 1007 may be formed of a single bus or may be formed of different buses between devices.

The base station 10 and the user equipment 20 may each include hardware, such as a microprocessor, a digital signal processor (DSP: Digital Signal Processor), an Application Specific Integrated Circuit (ASIC), a Programmable Logic Device (PLD), and a Field Programmable Gate Array (FPGA), which may implement some or all of the functional blocks. For example, processor 1001 may be implemented using at least one of these hardware components.

(Conclusion of the Embodiments)

In this specification, at least the user equipment and the communication method described below are disclosed.

A user equipment including a reception unit that performs a measurement for determining an optimum beam from among a plurality of reception beams that is usable in the user equipment; and a control unit that selects, based on information of a past measurement by the reception unit, a reception beam to be used in the user equipment, upon receiving, by the reception unit, a signal including information indicating to update a configuration.

According to the above-described configuration, the user equipment can select a reception beam by using a measurement result of a past measurement performed for selecting a reception beam, without the need to repeat performing the measurement to select the reception beam. Accordingly, time for switching a TCI state can be reduced.

When the reception unit receives the signal from the base station, and when a configuration of a plurality of reference signals used for a received quality measurement of a plurality of beams transmitted from the base station is not updated, the control unit may select the reception beam to be used in the user equipment based on the information of the past measurement by the reception unit.

The information indicating the update of the configuration may be a Radio Resource Control (RRC) reconfiguration message.

When an elapsed time from the time the past measurement was performed by the reception unit to the time at which the reception unit receives the signal from the base station is less than or equal to a predetermined threshold value, the control unit may select the reception beam to be used in the user equipment based on the information of the past measurement.

The control unit may change the predetermined threshold value according to a periodicity of reporting a result of a received quality measurement of a plurality of beams transmitted from the base station.

A communication method executed by a user equipment, the method including performing a measurement for determining an optimum beam from among a plurality of reception beams that is usable in the user equipment; and selecting, based on information of a past measurement by the reception unit, a reception beam to be used in the user equipment, upon receiving a signal including information indicating to update a configuration.

(Supplemental Embodiments)

While the embodiments of the present invention are described above, the disclosed invention is not limited to the described embodiments, and those skilled in the art will appreciate various alterations, modifications, alternatives, and substitutions. Descriptions are provided using specific numerical examples to facilitate understanding of the invention, but, unless as otherwise specified, these values are merely examples and any suitable value may be used. Classification of the items in the above descriptions is not essential to the present invention, and the items described in two or more items may be used in combination as needed, or the items described in one item may be applied (unless inconsistent) to the items described in another item. The boundaries of functional units or processing units in the functional block diagram do not necessarily correspond to the boundaries of physical components. An operation by a plurality of functional units may be physically performed by one component or an operation by one functional unit may be physically executed by a plurality of components. For the processing procedures described in the embodiment, the order of processing may be changed as long as there is no contradiction. For the convenience of the description of the process, the base station 10 and the user equipment 20 are described using functional block diagrams, but such devices may be implemented in hardware, software, or a combination thereof. Software operated by a processor included in the base station 10 in accordance with embodiments of the present invention and software operated by a processor included in the user equipment 20 in accordance with embodiments of the present invention may be stored in a random access memory (RAM), a flash memory (RAM), a read-only memory (ROM), an EPROM, an EEPROM, a register, a hard disk (HDD), a removable disk, a CD-ROM, a database, a server, or any other suitable storage medium, respectively.

Notification of information is not limited to the aspects/embodiments described in the disclosure, and notification of information may be made by another method. For example, notification of information may be implemented by physical layer signaling (e.g., DCI (Downlink Control Information), UCI (Uplink Control Information), higher layer signaling (e.g., RRC (Radio Resource Control) signaling, MAC (Medium Access Control) signaling, broadcast information (MIB (Master Information Block), SIB (System Information Block))), or other signals or combinations thereof. RRC signaling may be referred to as an RRC message, for example, which may be an RRC connection setup message, an RRC connection reconfiguration message, or the like.

The aspects/embodiments described in this disclosure may be applied to a system using at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), any other appropriate system, and a next generation system extended based on theses. Additionally, a plurality of systems may be combined (e.g., a combination of at least one of LTE and LTE-A and 5G) to be applied.

The processing procedures, sequences, flow charts, or the like of each aspect/embodiment described in this disclosure may be reordered, provided that there is no contradiction. For example, the methods described in this disclosure present elements of various steps in an exemplary sequence and are not limited to the particular sequence presented.

The particular operation described in this disclosure to be performed by the user equipment 20 may be performed by an upper node in some cases. It is understood that in a network formed of one or more network nodes having the user equipment 20, various operations performed for communicating with the terminal may be performed by at least one of the user equipment 20 and a network node other than the user equipment 20 (e.g., MME or S-GW can be considered, however, the network node is not limited to these). The case is exemplified above in which there is one network node other than the user equipment 20. However, the network node other than the user equipment 20 may be a combination of multiple other network nodes (e.g., MME and S-GW).

Input and output information may be stored in a specific location (e.g., memory) or managed using management tables. Input and output information may be overwritten, updated, or added. Output information may be deleted. The input information may be transmitted to another device.

The determination may be made by a value (0 or 1) represented by 1 bit, by a true or false value (Boolean: true or false), or by comparison of numerical values (e.g., a comparison with a predefined value).

The aspects/embodiments described in this disclosure may be used alone, in combination, or switched with implementation. Notification of predetermined information (e.g. "X" notice) is not limited to a method that is explicitly performed, and may also be made implicitly (e.g. "no notice of the predetermined information").

Software should be broadly interpreted to mean, regardless of whether referred to as software, firmware, middleware, microcode, hardware description language, or any other name, instructions, sets of instructions, code, code segments, program code, programs, subprograms, software modules, applications, software applications, software packages, routines, subroutines, objects, executable files, executable threads, procedures, functions, and so forth.

Software, instructions, information, or the like may also be transmitted and received via a transmission medium. For example, when software is transmitted from a website, server, or other remote source using at least one of wireline technology (such as coaxial cable, fiber optic cable, twisted pair, digital subscriber line) and wireless technology (e.g., infrared or microwave), at least one of these wireline technology and wireless technology is included within the definition of a transmission medium.

The information, signals, or the like described in this disclosure may be represented using any of a variety of different techniques. For example, data, instructions, commands, information, signals, bits, symbols, chips, or the like, which may be referred to throughout the above description, may be represented by voltages, currents, electromagnetic waves, magnetic fields or magnetic particles, optical fields or photons, or any combination thereof.

The terms described in this disclosure and those necessary for understanding this disclosure may be replaced by terms having the same or similar meanings. For example, at least one of the channels and the symbols may be a signal (signaling). The signal may also be a message. The component carrier may also be referred to as a carrier frequency, cell, frequency carrier, and so forth.

As used in this disclosure, the terms "system" and "network" are used interchangeably. The information, parameters, or the like described in the present disclosure may also be expressed using absolute values, relative values from predetermined values, or they may be expressed using corresponding separate information. For example, radio resources may be those indicated by an index.

The name used for the parameters described above are not restrictive in any respect. In addition, the mathematical equations using these parameters may differ from those explicitly disclosed in this disclosure. Since the various channels (e.g., PUCCH and PDCCH) and information elements can be identified by any suitable name, the various names assigned to these various channels and information elements are not in any way limiting.

In this disclosure, the terms "Base Station," "Radio Base Station," "Fixed Station," "NodeB," "eNodeB(eNB)," "gNodeB (gNB)," "Access Point," "Transmission Point," "Reception Point," "Transmission/Reception Point," "Cell," "Sector," "Cell Group," "Carrier," "Component Carrier," and the like may be used interchangeably. The base stations may be referred to as macro-cell, small-cell, femto-cell, pico-cell, or the like.

The base station can accommodate one or more (e.g., three) cells. Where the base station accommodates a plurality of cells, the entire coverage area of the base station can be divided into a plurality of smaller areas, each smaller area can also provide communication services by means of a base station subsystem (e.g., an indoor small base station (RRH) or a remote Radio Head). The term "cell" or "sector" refers to a portion or all of the coverage area of at least one of the base station and base station subsystem that provides communication services at the coverage.

In this disclosure, terms such as "mobile station (MS: Mobile Station)," "user terminal," "user equipment (UE: User Equipment)," and "terminal" may be used interchangeably.

The mobile station may be referred to by one of ordinary skill in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term.

At least one of a base station and a mobile station may be referred to as a transmitter, receiver, communication device, or the like. At least one of a base station and a mobile station may be a device installed in a mobile body, a mobile body itself, or the like. The mobile body may be a vehicle (e.g., a car or an airplane), an unmanned mobile (e.g., a drone or an automated vehicle), or a robot (manned or unmanned). At least one of a base station and a mobile station includes a device that does not necessarily move during communication operations. For example, at least one of a base station and a mobile station may be an Internet of Things (IoT) device such as a sensor.

In addition, the base station in the present disclosure may be replaced with the user terminal. For example, various aspects/embodiments of the present disclosure may be applied to a configuration in which communication between the base stations and the user terminal is replaced with communication between multiple user terminals (e.g., may be referred to as Device-to-Device (D2D) or Vehicle-to-Everything (V2X)). In this case, a configuration may be such that the above-described function of the user equipment 20 is included in the user terminal 20. The terms "up" and "down" may also be replaced with the terms corresponding to terminal-to-terminal communication (e.g., "side"). For example, an uplink channel, a downlink channel, or the like may be replaced with a sidelink channel. Similarly, the user terminal according to the present disclosure may be replaced with a base station. In this case, a configuration may be such that, the function included in the above-described user terminal 20 may be included in the user equipment 20.

The term "connected" or "coupled" or any variation thereof means any direct or indirect connection or connection between two or more elements and may include the presence of one or more intermediate elements between two elements "connected" or "coupled" with each other. The coupling or connection between the elements may be physical, logical, or a combination of these. For example, "connection" may be replaced with "access." As used in the present disclosure, the two elements may be considered as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS (Reference Signal) or may be referred to as a pilot, depending on the standards applied.

As used in this disclosure, the expression "based on" does not mean "based on only" unless otherwise specified. In other words, the expression "based on" means both "based on only" and "at least based on."

As long as "include," "including," and variations thereof are used in this disclosure, the terms are intended to be inclusive in a manner similar to the term "comprising." Furthermore, the term "or" used in the disclosure is intended not to be an exclusive OR.

In the present disclosure, for example, if an article is added by translation, such as a, an, and the in English, the present disclosure may include that the noun following the article is plural.

In the present disclosure, the term "A and B are different" may imply that "A and B are different from each other." Note that the term may also imply "each of A and B is different from C." The terms, such as "separated" or "coupled," may also be interpreted similarly.

While the present invention is described in detail above, those skilled in the art will appreciate that the present invention is not limited to the embodiments described in the present specification. The present invention may be implemented as modifications and variations without departing from the gist and scope of the disclosure as defined by claims. Accordingly, the description of the present specification is for illustrative purposes only and is not intended to have any restrictive meaning with respect to the present invention.

LIST OF REFERENCE SYMBOLS 110 transmission unit
120 reception unit
130 control unit
210 transmission unit
220 reception unit
230 control unit
1001 processor
1002 memory
1003 storage
1004 communication device 1005 input device
1006 output device

The invention claimed is:

1. A terminal comprising:
a receiver that receives Radio Resource Control (RRC) signaling for changing a Transmission Configuration Indication (TCI) state; and
a processor that changes the TCI state,
wherein, when the receiver receives the RRC signaling, and if, during a predetermined time period before receiving the RRC signaling, a layer 1 Reference Signal Received Power (L1-RSRP) for a TCI state to be updated is measured and reporting of the L1-RSRP is made, the processor changes the TCI state to the TCI state to be updated with a small delay compared to a case where the L1-RSRP reporting for the TCI state to be updated is not made during the predetermined time period before receiving the RRC signaling, and
wherein the predetermined time period is from a transmission of a reference signal for the L1-RSRP reporting for the TCI state to be updated until exactly before receiving the RRC signaling.

2. The terminal of claim 1, wherein the change of the TCI state by the processor includes a change of a reception beam.

3. A communication method by a terminal, the method comprising:
receiving Radio Resource Control (RRC) signaling for changing a Transmission Configuration Indication (TCI) state,
wherein, when the RRC signaling is received, and if, during a predetermined time period before receiving the RRC signaling, a layer 1 Reference Signal Received Power (L1-RSRP) for a TCI state to be updated is measured and reporting of the L1-RSRP is made, changing the TCI state to the TCI state to be updated with a small delay compared to a case where the L1-RSRP reporting for the TCI state to be updated is not made during the predetermined time period before receiving the RRC signaling, and
wherein the predetermined time period is from a transmission of a reference signal for the L1-RSRP reporting for the TCI state to be updated until exactly before receiving the RRC signaling.

4. A radio communication system comprising:
a base station including a transmitter that transmits Radio Resource Control (RRC) signaling for changing a Transmission Configuration Indication (TCI) state; and
a terminal including a receiver that receives the RRC signaling; and a processor that changes the TCI state,
wherein, when the receiver receives the RRC signaling, and if, during a predetermined time period before receiving the RRC signaling, a layer 1 Reference Signal Received Power (L1-RSRP) for a TCI state to be updated is measured and reporting of the L1-RSRP is made, the processor changes the TCI state to the TCI state to be updated with a small delay compared to a case where the L1-RSRP reporting for the TCI state to be updated is not made during the predetermined time period before receiving the RRC signaling, and
wherein the predetermined time period is from a transmission of a reference signal for the L1-RSRP reporting for the TCI state to be updated until exactly before receiving the RRC signaling.

* * * * *